2,855,419
4-OXY-3,5-DIPROPYLBENZOATES AND PROCESS

William B. Reid and Patrick H. Seay, Kalamazoo Township, Kalamazoo County, Mich., assignors to The Upjohn Company, Kalamazoo, Mich., a corporation of Michigan No Drawing. Application August 10, 1956
Serial No. 603,236

9 Claims. (Cl. 260—448)

This invention relates to new organic compounds and the process of making the same, and is more particularly directed to novel 3,5-di-n-propyl-4-allyloxybenzoic acid and the salts and esters thereof and intermediates thereto.

The novel compounds of the present invention can, for the most part, be represented by the following general formula:

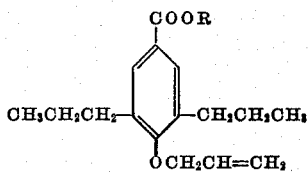

wherein R is selected from the group consisting of hydrogen, a pharmacologically acceptable cation, and a lower alcohol radical. The term "pharmacologically acceptable cation" includes the alkali and alkaline earth metals, ammonium and substituted ammonium, aluminum and other nontoxic cations. The term "lower alcohol radical" refers to a radical obtained by removing the hydroxy group from an alcohol containing from one to nine carbon atoms, inclusive.

It is an object of the invention to produce novel 3,5-di-n-propyl-4-allyloxybenzoic acid and the salts and esters thereof and intermediates thereto. Other objects of the invention will be apparent to those skilled in the art to which the invention pertains.

The novel compounds of this invention possess valuable therapeutic properties; e. g., they are drug potentiators and tranquillizing agents and also can be used to prolong the activity of anesthetics, analgesics, sedatives, and hypnotics.

The process of this invention comprises hydrogenating an ester of 3,5-diallyl-4-hydroxybenzoic acid in the presence of a hydrogenation catalyst to produce the corresponding ester of 3,5-di-n-propyl-4-hydroxybenzoic acid, and reacting the ester of 3,5-di-n-propyl-4-hydroxybenzoic acid with an allyl halide in the presence of an alkali to produce the corresponding ester of 3,5-di-n-propyl-4-allyloxybenzoic acid. The resulting ester of 3,5-di-n-propyl-4-allyloxybenzoic acid can be saponified to produce 3,5-di-n-propyl-4-allyloxybenzoic acid.

An outline of the process and a procedure for the production of the novel compounds of this invention is shown in the following reaction scheme:

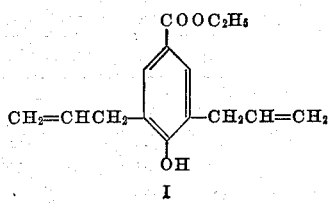

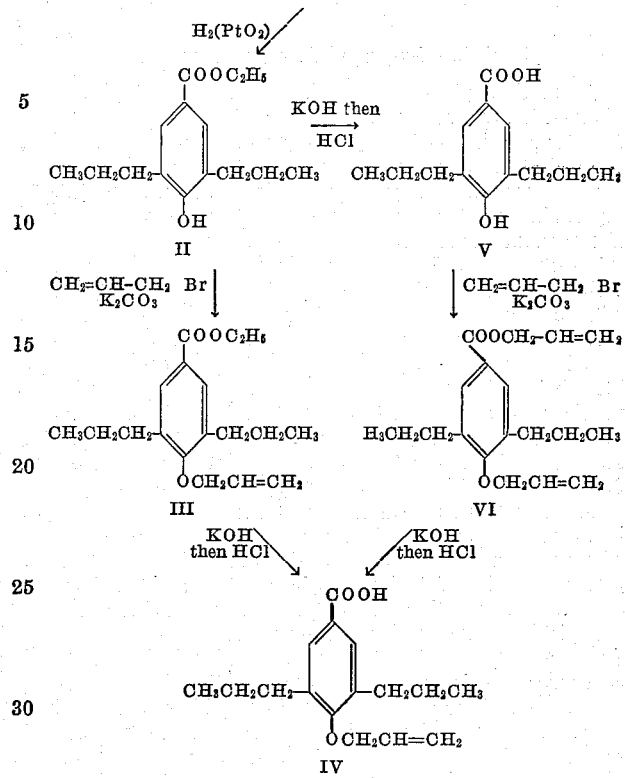

The starting materials include the esters of 3,5-diallyl-4-hydroxybenzoic acid, preferably ethyl 3,5-diallyl-4-hydroxybenzoate (I), which can be prepared by the procedure of Claisen and Eisleb, Liebig's Annalen der Chemie, 401, 21 (1913). The starting material is first dissolved in an inert solvent. For this purpose any inert solvent, such as ethyl alcohol, methyl alcohol, dioxan, or acetic acid, can be used. By "inert solvent" is meant "a liquid which dissolves another substance . . . without any change in chemical composition" [Hackh's Chemical Dictionary, 3rd edition, page 788]. The dissolved starting material is then hydrogenated with platinum oxide, palladium oxide, Raney nickel or other hydrogenation catalyst to produce the corresponding ester (II) of 3,5-di-n-propyl-4-hydroxybenzoic acid which is separated. The latter compound is then dissolved in an inert solvent, such as acetone, methyl ethyl ketone, or dioxan, and reacted with allyl bromide and sodium or potassium carbonate to produce the corresponding ester (III) of 3,5-di-n-propyl-4-allyloxybenzoic acid which in turn is separated. The last compound (III) is converted to the free 3,5-di-n-propyl-4-allyloxybenzoic acid (IV) by saponification with sodium or potassium hydroxide followed by acidification using conventional procedure.

The 3,5-di-n-propyl-4-allyloxybenzoic acid is also obtained by the following alternate procedure:

The ester of 3,5-di-n-propyl-4-hydroxybenzoic acid (II) is saponified, such as with alcoholic potassium hydroxide followed by acidification with hydrochloric acid, to produce the free 3,5-di-n-propyl-4-hydroxybenzoic acid (V). This compound is then reacted with allyl bromide or allyl chloride in the presence of potassium carbonate to produce allyl 3,5-di-n-propyl-4-allyloxybenzoate (VI). This compound, an allyl ether-allyl ester, is reacted with alcoholic potassium hydroxide followed by acidification with hydrochloric acid to hydrolyze the ester group without affecting the ether group to produce 3,5-di-n-propyl-4-allyloxybenzoic acid (IV).

The invention may now be more fully understood by referring to the following examples which are illustrative of the novel compounds of the invention and their preparation, but are not to be construed as limiting.

EXAMPLE 1

*Ethyl 3,5-di-n-propyl-4-hydroxybenzoate*

A solution of 962 grams (3.9 moles) of ethyl 3,5-diallyl-4-hydroxybenzoate [Claisen and Eisleb, Ann. 401, 21 (1913)] in 2600 milliliters of ethanol was hydrogenated at 60 pounds per square inch pressure and room temperature with 2.6 grams of platinum dioxide catalyst. Approximately the theoretical amount of hydrogen was absorbed in about one-half to one hour. The catalyst was removed by filtering the mixture through charcoal giving a dark solution. The solution was treated again with charcoal under reflux for twenty minutes and filtered. The still dark solution was distilled under reduced pressure nearly to dryness and diluted to 2.3 liters with Skellysolve B [a petroleum solvent boiling at sixty to seventy degrees centigrade and consisting mainly of n-hexane] and cooled. A crystalline product separated which was filtered off and identified as ethyl 3,5-di-n-propyl-4-hydroxybenzoatae; weight 35 grams.

The filtrate was distilled to 1.2 liters, diluted to two liters with pentane, and cooled. A crystalline product separated on standing. An additional yield of 27.5 grams of ethyl 3,5-di-n-propyl-4-hydroxybenzoate was obtained by filtration of this crystalline product. The two yields were combined to give 62.5 grams of ethyl 3,5-di-n-propyl-4-hydroxybenzoate, melting point 62 to 65 degrees centigrade.

The filtrate was diluted to five liters with pentane and repeatedly extracted with ice-cold five percent aqueous sodium hydroxide. The aqueous solutions were combined, washed with ether, filtered, and acidified with a large excess of solid carbon dioxide. The resulting gummy precipitate was extracted with ether, the ether solution was washed with water and then with saturated sodium chloride solution, dried over anhydrous sodium sulfate, filtered and distilled. After removal of the solvent the product distilled smoothly at 143–152 degrees centigrade at 0.025 to 0.1 millimeter pressure. Considerable undistillable tar remained. The distillate solidified in the receiver giving 381.4 grams of ethyl 3,5-di-n-propyl-4-hydroxybenzoate, melting point 55–62 degrees centigrade. The total yield was 444 grams (46 percent).

Instead of the ethyl 3,5-diallyl-4-hydroxybenzoate of Example 1, the methyl, isopropyl, n-butyl, n-hexyl, n-octyl, cyclopentyl, cyclohexyl, benzyl, allyl, phenethyl, or cinnamyl esters of 3,5-diallyl-4-hydroxybenzoate can be used as starting materials and treated following the procedure shown in Example 1 to obtain the corresponding saturated esters of 3,5-di-n-propyl-4-hydroxybenzoic acid. The unsaturated esters are hydrogenated to the corresponding saturated esters so that the final products in case of the allyl and cinnamyl esters are n-propyl 3,5-di-n-propyl-4-hydroxybenzoate and 3-phenylpropyl 3,5-di-n-propyl-4-hydroxybenzoate, respectively.

EXAMPLE 2

*Ethyl 3,5-di-n-propyl-4-allyloxybenzoate*

To a solution of 62.5 grams (0.25 mole) of ethyl 3,5-di-n-propyl-4-hydroxybenzoate (first two crystalline crops melting at 62–65 degrees centigrade) in 260 milliliters of acetone was added 36 grams (0.26 mole) of potassium carbonate and 36.3 grams (0.3 mole) of allyl bromide. The mixture was heated under reflux with vigorous stirring for ten hours, filtered, and the solvent was removed by distillation. The product was distilled through a six-inch column packed with one-eighth inch helices yielding 63.5 grams (87.3 percent) of ethyl 3,5-di-n-propyl-4-allyloxybenzoate as a light yellow liquid; boiling point 125–126 degrees centigrade at 0.04 millimeter; $n_D^{25}=1.5041$.

Instead of the ethyl 3,5-di-n-propyl-4-hydroxybenzoate of Example 2, the methyl, isopropyl, n-butyl, n-hexyl, n-octyl, cyclopentyl, cyclohexyl, benzyl, n-propyl, phenethyl, or 3-phenylpropyl esters can be used as starting materials and treated following the procedure shown in Example 2 to produce the corresponding ester of 3,5-di-n-propyl-4-allyloxybenzoic acid.

EXAMPLE 3

*3,5-di-n-propyl-4-allyloxybenzoic acid*

A solution of 62.5 grams (0.215 mole) of ethyl 3,5-di-n-propyl-4-allyloxybenzoate, 75 grams (1.3 moles) of potassium hydroxide (85 percent pure) in 250 milliliters of ethanol and 15 milliliters of water was heated under reflux for seven and one-half hours. Most of the solvent was distilled under reduced pressure. Water was added, the mixture was extracted twice with ether, and acidified with hydrochloric acid to give a yellow oil which soon crystallized. The product was collected by filtration, washed with water and dried yielding 51.4 grams (91 percent) of 3,5-di-n-propyl-4-allyloxybenzoic acid as a yellow solid, melting point 72–74 degrees centigrade. The product was recrystallized from about sixty milliliters of Skellysolve B yielding 36.3 grams of nearly white solid, melting point 74–75 degrees centigrade in melting point tube or 81.5–82 degrees centigrade on Fisher-Johns block. An additional 12.8 grams (total yield 87 percent), melting point 71–73 degrees (in melting point tube) was obtained from the filtrate. The infrared spectrum confirmed the structure.

*Analysis.*—Calcd. for $C_{16}H_{22}O_3$: C, 73.28; H, 8.40; Neut. Equiv., 262.34. Found: C, 73.09; H, 8.43; Neut. Equiv., 260.6.

Instead of the ethyl 3,5-di-n-propyl-4-allyloxybenzoate of Example 3, the methyl, isopropyl, n-butyl, n-hexyl, n-octyl, cyclopentyl, cyclohexyl, benzyl, n-propyl, phenethyl, or 3-phenylpropyl esters can be used as starting materials and treated following the procedure shown in Example 3 to produce 3,5-di-n-propyl-4-allyloxybenzoic acid.

The 3,5-di-n-propyl-4-allyloxybenzoic acid, either as such or by first converting it into the acid chloride or acid bromide, can be esterified with suitable alcohols, such as methyl, ethyl, isopropyl, n-butyl, n-hexyl, n-octyl, cyclopentyl, cyclohexyl, benzyl, allyl, phenethyl, or cinnamyl alcohol to form the corresponding esters.

The 3,5-di-n-propyl-4-allyloxybenzoic acid can also be reacted with bases such as sodium hydroxide, potassium hydroxide, calcium oxide, sodium carbonate, aluminum oxide, ammonia or substituted ammonium compounds, such as methylamine, ethylamine, and dimethyl amine, to form the corresponding salt of 3,5-di-n-propyl-4-allyloxybenzoic acid.

The $LD_{50}$ of ethyl 3,5-di-n-propyl-4-allyloxybenzoate was found to be 650 milligrams per kilogram; the $LD_{50}$ of 3,5-di-n-propyl-4-allyloxybenzoic acid was found to be 767 milligrams per kilogram; both values were determined intraperitoneally in mice. These two compounds were compared with chlorpromazine in the standard hexobarbital sleeping test with the substances administered intraperitoneally to mice. The results obtained are shown below:

| Dose in Percent of $LD_{50}$ | Percent Increase in Sleeping Time | | |
| --- | --- | --- | --- |
| | Ethyl 3,5-di-n-propyl-4-allyloxybenzoate | 3,5-Di-n-propyl-4-allyloxybenzoic acid | Chlorpromazine |
| 40 | | 1,034 | 819 |
| 20 | 552 | 805 | 577 |
| 10 | 369 | 644 | 402 |
| 5 | 333 | 554 | 271 |
| 2.5 | 235 | 435 | 210 |

The novel compounds of this invention can be combined with solid or liquid pharmaceutical carriers and formulated into the form of tablets, powder packets, or capsules, or dissolved or suspended in suitable solvents, for oral or parenteral administration.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the class consisting of 3,5-di-n-propyl-4-allyloxybenzoates having the formula:

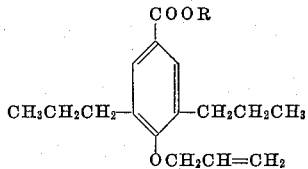

wherein R is selected from the group consisting of hydrogen, pharmacologically acceptable cations and lower alcohol radicals containing one to nine carbon atoms, inclusive.

2. An ester of 3,5-di-n-propyl-4-allyloxybenzoic acid wherein the lower alcohol radical of the ester group contains one to nine carbon atoms, inclusive.

3. Ethyl 3,5-di-n-propyl-4-allyloxybenzoate.

4. 3,5-di-n-propyl-4-allyloxybenzoic acid.

5. Salts of 3,5-di-n-propyl-4-allyloxybenzoic acid with a pharmacologically acceptable cation.

6. An ester of 3,5-di-n-propyl-4-hydroxybenzoic acid wherein the lower alcohol radical of the ester group contains one to nine carbon atoms, inclusive.

7. Ethyl 3,5-di-n-propyl-4-hydroxybenzoate.

8. The process which comprises hydrogenating an ester of 3,5-diallyl-4-hydroxybenzoic acid in the presence of a hydrogenation catalyst to produce the corresponding ester of 3,5-di-n-propyl-4-hydroxybenzoic acid, and reacting the 3,5-di-n-propyl-4-hydroxybenzoic acid ester with an allyl halide in the presence of an alkali to produce the corresponding ester of 3,5-di-n-propyl-4-allyloxybenzoic acid.

9. The process which comprises hydrogenating an ester of 3,5-diallyl-4-hydroxybenzoic acid in the presence of a hydrogenation catalyst to produce the corresponding ester of 3,5-di-n-propyl-4-hydroxybenzoic acid, reacting the ester of 3,5-di-n-propyl-4-hydroxybenzoic acid with an allyl halide in the presence of an alkali to produce the corresponding ester of 3,5-di-n-propyl-4-allyloxybenzoic acid and saponifying the ester to produce 3,5-di-n-propyl-4-allyloxybenzoic acid.

References Cited in the file of this patent

Claisen et al.: Chem. Abst., 8, 64 to 67 (1914); citing Ann. 401, 21 (1913).

Beilstein X, 121 (1932).